Figure 1:
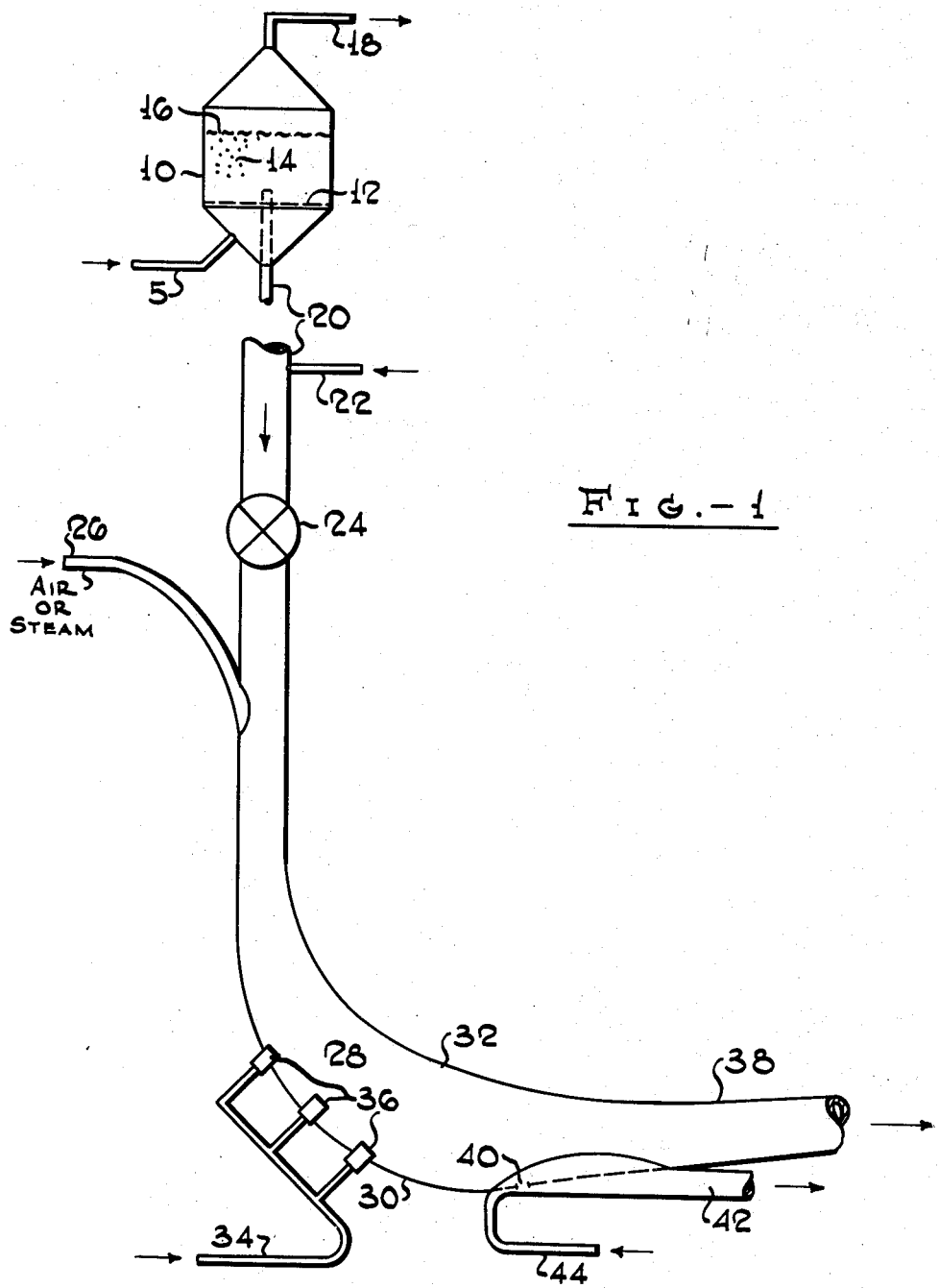

Nov. 10, 1953  A. B. WELTY, JR  2,658,860
SEPARATION OF CONTAMINATED CATALYST PARTICLES
IN A HYDROCARBON CONVERSION PROCESS
Original Filed June 28, 1946  2 Sheets-Sheet 1

Albert B. Welty, Jr. Inventor
By V. J. Whelan Attorney

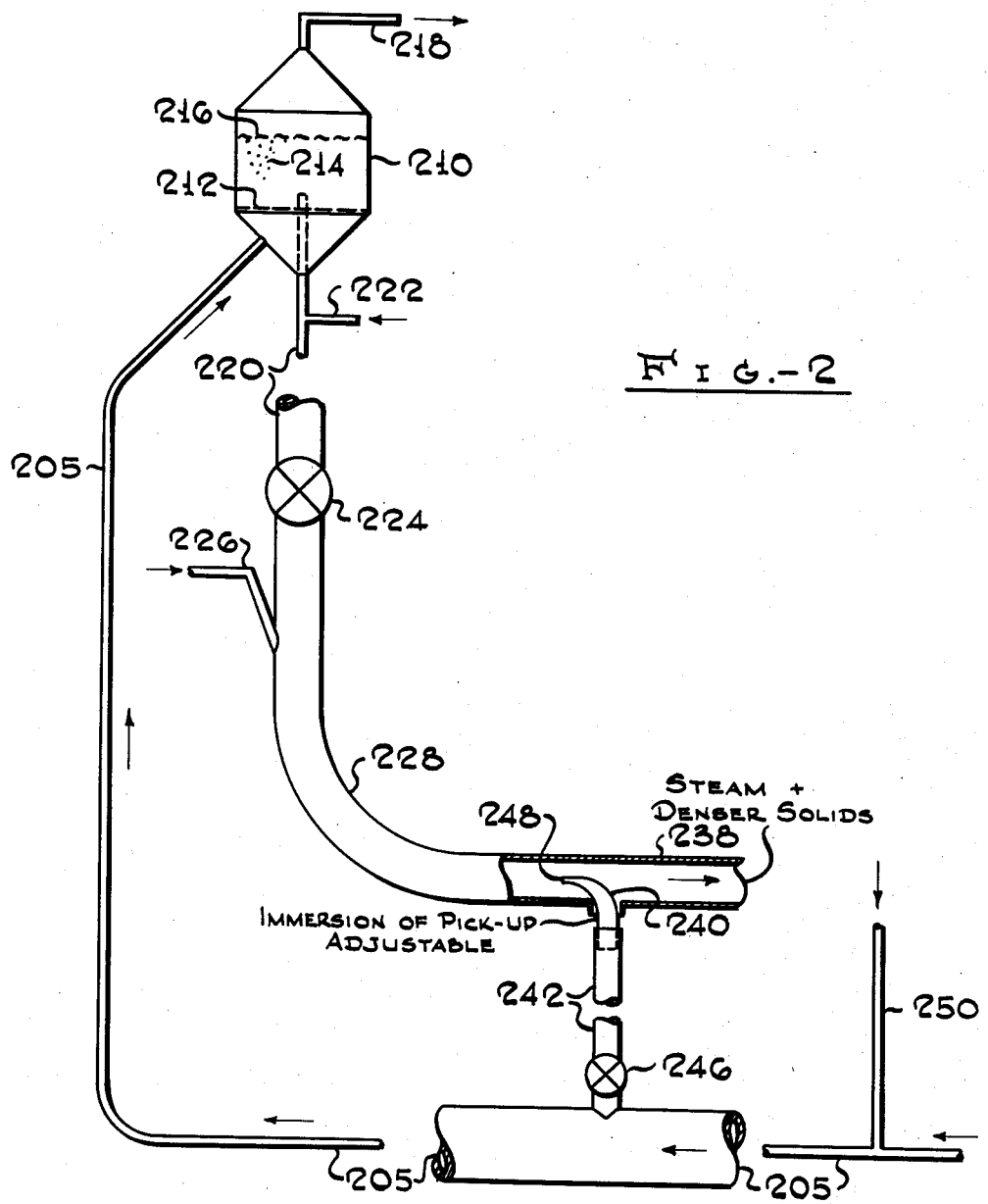

Patented Nov. 10, 1953

2,658,860

UNITED STATES PATENT OFFICE 2,658,860

SEPARATION OF CONTAMINATED CATALYST PARTICLES IN A HYDROCARBON CONVERSION PROCESS

Albert B. Welty, Jr., Deer Path, Mountainside, N. J., assignor to Standard Oil Development Company, a corporation of Delaware Original application June 28, 1946, Serial No. 679,885. Divided and this application June 30, 1950, Serial No. 171,427

4 Claims. (Cl. 196—52)

The present invention relates to the separation of solids. More specifically, the invention is concerned with the separation of finely divided solids of different gravity, particularly when present in the form of so-called "fluidized" gas-solids suspensions. This application is a division of my application Serial No. 679,885, filed June 28, 1946, and since abandoned.

The application of the so-called "fluid solids technique" to various chemical processes and physical treating methods is well known in the art. This technique normally comprises contacting vapors or gases with a bed of finely divided solids agitated by a stream of gas to form a dense turbulent ebullient mass resembling a liquid with respect to hydrodynamic and hydrostatic properties as well as with respect to heat transfer and distribution characteristics. The superiority of the fluid solids technique over fixed bed operation with respect to heat and materials economies, process control, ease of solids handling, etc. is a matter of record. These advantages have been utilized in numerous processes such as various catalytic hydrocarbon conversion, catalytic synthesis of hydrocarbons from carbon monoxide and hydrogen, retorting and gasification of carbonaceous solids, dehydrating and gas purification processes, and others.

In many of these processes mixtures of different solids serving different purposes are contacted with the gases and are affected by the gas contact in different ways so as to require different treatments to restore their usefulness in the original gas contacting process. In other processes solids of uniform composition and particle size used in the early stages of the process become irregular in particle size and/or composition as a result of erosion, irregular chemical changes, or physical contamination, irregular deposits of non-volatile reaction products, etc., so as to form mixtures of particles of relatively high and relatively low utility for the gas contacting process, which require different treatments for reactivation or other purposes.

Examples of such processes are various catalytic gas phase reactions such as catalytic cracking hydrogenation, dehydrogenation, hydrocarbon synthesis, etc. wherein fluidized catalyst is subjected to erosion and becomes contaminated by carbon deposits and/or metallic iron picked up from the reactor walls, conduits, valves, etc. Catalyst fines of undesirably small particle size have to be discarded or worked up again to the proper size. Iron containing particles must be removed. Particles carrying excessive amounts of carbon must be regenerated by burning off the carbon. Unchanged constituents may be reused without further treatment. In the production of water gas by the simultaneous oxidation and reformation of methane with fluidized mixtures of metal oxides and reformer catalysts, the metal oxide must be regenerated by reoxidation while the reformer catalyst should remain in the reduced state. Other examples will occur to those skilled in the art.

In order to subject the different constituents of fluidized solids mixtures of the above-mentioned types to specific individual treatments, it is necessary to effect at least a crude separation of these constituents. It has been found that in all cases in which the different constituents of such fluidized solids mixtures differ substantially in density a separation according to density may be accomplished by simple means. The present invention refers to such means.

It is, therefore, the principal object of my invention to provide means for separating fluidized solids mixtures into constituents of different density.

A more specific object of my invention is to provide means for separating fluidized solids mixtures used in catalytic gas phase reactions into constituents of different density.

A still more specific object of my invention is to provide means for separating fluidized solids mixtures used in catalytic gas phase reactions into constituents of different density, subjecting the separated constituents to different treatments and reusing one or all of the constituents in the catalytic gas phase reaction.

Further and more specific objects and numerous advantages of the invention will appear from the following description thereof read with reference to the accompanying drawing which shows semi-diagrammatic views of apparatus adapted to carry out preferred embodiments of the invention.

In accordance with the present invention a fluidized solids mixture to be separated into constituents of different density is passed through a confined path and subjected therein to a sudden change of direction of flow at a flow velocity sufficiently high to develop an appreciable centrifugal force at the point of directional change, which causes a concentration of relatively heavy constituents in the approximate direction of said centrifugal force and of relatively light constituents in a direction approximately opposite to said centrifugal force. As a result, the fluidized solids leave the point of directional change and continue, roughly classified in accordance with density, for a certain distance on their path in the changed direction, from which they may be separately removed by suitable means. By subjecting the separated crude fractions to repeated separations of the same type a practically quantitative separation by density may be accomplished.

Having set forth its objects and general nature the invention will be best understood from the more detailed description hereinafter, in which reference will be made to the accompanying drawing wherein Figure 1 is a diagrammatic view of means adapted to carry out a preferred embodiment of the invention; and Figure 2 illustrates a different embodiment of the invention in a similar manner.

The system illustrated in Figure 1 will be described in detail with specific reference to the selective separation of iron particles or catalyst particles high in iron content from the circulating catalyst stream in a fluid catalyst cracking unit. Only those elements of the cracking unit are shown which are essential for a proper understanding of the invention and it will be appreciated that a similar system may be used in connection with other fluid operations involving generally analogous fluidized-solids conditions.

Referring now in detail to Figure 1 the reference symbol 10 denotes a chamber containing a dense turbulent mass of finely divided cracking catalyst such as a natural or synthetic silicious or alumina gel fluidized by a gas admitted through pipe 5 and distribution grid 12. Chamber 10 may be the cracking or the regeneration zone or a fluidized feed hopper or similar element of the cracking unit. For the purposes of this example chamber 10 will be assumed to be the cracking zone.

A suspension of fresh and/or regenerated cracking catalyst such as a finely divided synthetic silica-alumina gel in hydrocarbon vapors is introduced through line 5 into chamber 10 which is maintained at cracking conditions of temperature and pressure. The catalyst forms a dense highly turbulent fluidized phase 14 having an upper level 16. Cracked vapors containing a small amount of entrained catalyst fines leave overhead through line 18 and may be subjected to any desired treatment for product recovery by means of conventional equipment (not shown) which may include a gas-solids separation zone to return catalyst fines to chamber 10 in a manner known per se.

Catalyst phase 14 contains a major proportion say about 95-98% by volume of relatively pure gel particles which may have a size of about 50-400 mesh, preferably about 100-325 mesh on the average, and a density in compact form of about 0.75-1, a minor proportion, say about 1-4%, of gel particles of similar size but substantially higher density of about 1.0-3.0 resulting from contamination by iron picked up in the course of the catalyst circulation through the system, and a still smaller proportion say about 0.5-2% of particles of smaller size but highest density of normally greater than 3.0 consisting substantially of iron eroded from equipment walls. After a contact time of a few seconds the activity of the catalyst drops as a result of carbon deposits which must be burned off to regenerate the catalyst. At the same time it is desirable to remove the iron from the catalyst in order to prevent excessive accumulation of iron which may result in detrimental side reactions and a decrease of catalytic activity.

In order thus to recondition the catalyst a fluidized mixture of solids is withdrawn downwardly from chamber 10 at a point above grid 12 and passed by gravity through a vertical standpipe 20 which may be aerated with a fluidizing gas, such as steam admitted through one or more taps 22, to facilitate the downward flow of the solids. Standpipe 20 is provided in its lower portion with a slide valve 24 and, subsequent thereto on the path of the solids, with a gas admission line 26 through which a gas such as steam or air is injected in a downward direction to accelerate the flow of the suspension in the immediately following section of standpipe 20 to a speed of about 30 to 100 ft. per second.

At this speed, the solids enter the curved section 28 of standpipe 20 where they are subjected to the action of the centrifugal force resulting from the directional change of flow through approximately a right angle. This centrifugal force causes the heavier particles to concentrate toward the outside 30 and the lighter particles towards the inside 32 of curve 28. This classification may be further encouraged by bleeding small amounts of a gas such as steam or air through line 34 and taps 36 into curved section 28, which may have a radius of curvature within the approximate range of 5-30 ft.

The solids leave curve 28 and enter the horizontal section 38 crudely classified according to density, the bottom layer being enriched in relatively heavy iron and iron-containing particles and the top layer in relatively light iron-free gel catalyst. Depending on the velocity of the solids this separation may amount to 70-80% of perfect separation, a separation of 20-30% of perfect being usually adequate in the case of cracking catalysts of the gel type. Pipe section 38 is provided with an adjustable bottom orifice 40 which opens into a substantially horizontal withdrawal pipe 42 through which any desired proportions of the lower solids layers or strata in pipe section 38 may be removed. The flow of solids through orifice 40 and pipe 42 may be encouraged by injecting a suitable gas such as steam, air, or the like through line 44 into pipe 42 to produce a jet-type action. The iron and iron-containing solids thus removed may be discarded or treated in any suitable manner for the recovery of cracking catalyst.

Solids having a lesser specific gravity than those withdrawn through pipe 42 and consisting substantially of coke-deactivated iron-free cracking catalyst pass on through pipe 38 and may be conveyed to a conventional regeneration zone (not shown) and from there back to cracking chamber 10 in any suitable manner known per se.

The embodiment of my invention illustrated by Figure 1 permits of various modifications. The cross-section of the curved pipe section 28 may have a size different from that of the straight pipe section in order to increase or decrease the flow speed of the solids and thus the separation efficiency of the process. The outside wall 30 of curved section 28 may be flattened down to a point close to orifice 40 in order to spread out the lowest and heaviest solids layer or stratum on as wide a surface as possible whereby the separating efficiency of the process may be further enhanced. If desired the solids withdrawn through pipe 42 and/or the solids passed on through pipe 38 may be subjected to a further separation treatment of the type described above or may be recycled in a suitable manner in order to accomplish more quantitative separation. Other modifications within the scope of my invention will appear to those skilled in the art.

In Figure 2, I have shown a system suitable for removing relatively light material from a fluidized mixture of relatively heavy and relatively light finely divided solids and its operation will be explained with reference to the separation of a fluidized mixture of metal oxide and reformer catalyst used in the production of water gas from methane as disclosed and claimed in greater detail in my copending application Serial No. 679,886, filed June 28, 1946, now U. S. Patent 2,550,742, issued on May 1, 1951, for improvements in "Conversion of Hydrocarbon Gases." In the present case I have concentrated on a description of the features and elements essential for the separation treatment as such and I wish it to be understood that my novel separation means as illustrated in Figure 2 are applicable to any process, other than methane conversion, involving fluidized solids mixtures having an adequate gravity differential, and the desirability of their separation by gravity.

Referring now in detail to Figure 2, a reaction vessel 210, such as a methane converter which may be provided with a distribution grid 212 contains a mixture of finely divided metal oxide and reformer catalyst. Iron oxides, copper oxides, vanadium pentoxide, stannic oxide and other metal oxides which are reducible to metal or lower states of oxidation by methane are useful metal oxides while the reformer catalyst preferably comprises metallic nickel supported on such specifically light carriers as alumina, magnesia, kaoline, etc. Methane is supplied through line 205 and enters converter 210 at an upward velocity adequate to form above grid 212 a fluidized dense turbulent mass of solids 214 having a well defined upper level 216. Suitable conditions of temperature, pressure and gas flow are maintained in converter 210 to convert the methane into water gas by oxidation and simultaneous reformation with $CO_2$ and/or water formed in the process. Product gas is withdrawn overhead through line 218 and passed to storage or further use.

In the course of the reaction the metal oxide is reduced so as to become useless as an oxidizing agent and to require oxidation with an oxidizing gas such as air. If the entire solids mixture is subjected to oxidation the reformer catalyst is likewise oxidized and loses its reformation activity. Substantial separation of the reduced metal oxide which usually has a specific gravity varying between about 3.0 and 5.0 from the reformer catalyst whose specific gravity is usually in the neighborhood of 1 or below 1, is therefore desirable prior to reoxidation of the metal oxide.

For this purpose, a fluidized mixture of reduced metal oxide and reformer catalyst is withdrawn downwardly from converter 210 through the substantially vertical standpipe 220 provided with slide valve 224 and aerated through one or more taps 222 with a fluidizing gas such as steam, flue gas or the like. The lower portion of standpipe 220 is curved at 228 and leads into a substantially horizontal pipe 238. The fluidized solids mixture flows down through standpipe 220 at a velocity of about ½ to 10 ft. per second which may be increased by steam added through line 226 to about 30 to 100 ft. per second. When the solids mixture enters, at the indicated velocities, the curved section 228, which may have a radius of curvature of about 5 to 30 ft., it is subjected to an appreciable centrifugal force which causes the heavier particles to concentrate toward the outside of the curve and the lighter particles toward the inside of the curve.

The mass leaves curve 228 crudely classified according to density, the bottom layer of the contents of pipe 238 being enriched in relatively heavy reduced metal oxide and the top layer in relatively light reformer catalyst. Depending on the velocity of the solids this separation may be such as to increase the concentration of reformer catalyst in the uppermost stream from, say 30% to 75–80%, a concentration of 50% being normally adequate to extend the life of the reformer catalyst to the desired degree.

At least a substantial portion of the top layer is removed from pipe 238 by means of a pick-up device 240 and returned through standpipe 242 provided with slide valve 246 to gas feed line 205 and from there to converter 210. Pick-up device 240 which is adjustable in height, and may penetrate pipe 238 to any desired level is provided with a preferably elongated horizontal orifice 248 whose length may be about ¼–¾ and whose height about $\frac{1}{10}$–¼ of the diameter of pipe 238. By raising or lowering pick-up device 240 it is possible to remove from 238 fractions or layers or strata of any desired ratio of relatively heavy reduced metal oxide to relatively light reformer catalyst within the limits determined by the concentration gradient across the height of pipe 238.

Solids by-passing pick-up device 240 flow through pipe 238 to enter a reoxidizer (not shown) and to be returned from there through lines 250 and 205 to converter 210.

In the above examples, I have shown a vertical flow of the solids mixture through pipes 20 and 220 and curved sections 28 and 228 and this is the preferred manner of carrying out the invention because the gravitational force may be utilized to increase the flow velocity and the separating effect of the directional change. However, similar effects may be accomplished with a horizontal or inclined direction of flow, provided sufficiently high flow velocities and sharp directional changes are chosen. More than one separation system of the type shown in Figure 2 or a suitable recycle system may be used in a manner obvious to one skilled in the art, if a more complete separation is desired.

It should also be understood that my invention is not limited to the separation of heavy constituents from cracking catalyst or of reformer catalyst from its mixtures with metal oxides but may be applied to all cases in which it is desired to separate relatively light from relatively heavy solid particles contained in a fluidized mass of finely divided solids. For example, in all cases in which non-fluidizable fines are to be removed from fluidized solids of fluidizable particle size my invention may be used to greatest advantage. Another example, is the catalytic synthesis of hydrocarbons wherein large amounts of carbon are deposited on the catalyst to decrease the true specific gravity of the particles. Such high-carbon particles may be separated from specifically heavier low-carbon particles in accordance with my invention substantially as explained above. Further examples will occur to those skilled in the art.

While the foregoing description and exemplary operations have served to illustrate specific applications and results of the invention, other modifications obvious to those skilled in the art are within the scope of the invention. Only such limitations should be imposed on the invention as are indicated in the appended claims.

What is claimed:

1. In a hydrocarbon conversion process wherein hydrocarbon vapors are contacted with a suspension of finely divided conversion catalyst consisting essentially of solid particles smaller than about 50 mesh and wherein the catalyst is circulated from the conversion zone to a regeneration zone and thence back to the conversion zone, the improvement which comprises withdrawing a relatively dense column of the finely divided catalyst particles downwardly from one of the aforesaid zones, injecting a gas into the withdrawn catalyst column to accelerate the flow of the resulting catalyst suspension to a velocity between about 30 to 100 feet per second, passing the catalyst suspension at this velocity through a confined, elongated path comprising a curved section of about 5 to 30 feet radius of curvature, thereby imparting an abrupt change in direction of catalyst flow and creating a centrifugal force at the point of directional change adequate to concentrate particles characterized by a relatively large individual particle weight in an outside stratum of the curved section of the catalyst path and to concentrate particles characterized by a relatively small individual particle weight in an inside stratum of the curved section of the catalyst path, injecting a small amount of extraneous gas into the outside stratum of solids in the curved section of the catalyst path approximately transversely to the direction of catalyst flow to strip out particles of relatively low specific gravity from the outside stratum into the inside stratum, selectively removing the outside stratum rich in contaminated catalyst particles of relatively high specific gravity, and recirculating the remainder of the catalyst to the conversion and regeneration zones.

2. In a process of catalytically cracking hydrocarbon oils wherein hydrocarbon vapors are contacted in a conversion zone with a dense turbulent fluidized bed of finely divided solid cracking catalyst ranging in size between about 100 and 400 mesh and wherein catalyst is withdrawn from said dense turbulent fluidized bed of the conversion zone and circulated to a regeneration zone and thence back to the conversion zone, the improvement which comprises withdrawing a relatively dense column of the finely divided solid catalyst particles downwardly from the conversion zone, injecting steam into a lower part of the withdrawn catalyst column to accelerate the flow of the resulting catalyst suspension to a velocity between about 30 to 100 feet per second, passing the catalyst suspension at this velocity downward through a confined elongated path comprising a section of about 5 to 30 feet radius of curvature and curved approximately through a right angle, thereby imparting an abrupt change in direction of flow of the catalyst suspension and creating a centrifugal force at the point of directional change adequate to concentrate solids characterized by a relatively large individual particle weight in an outside stratum of the curved section of the catalyst path and to concentrate solids characterized by a relatively small individual particle weight in an inside stratum of the curved section of the catalyst path, injecting a small amount of gas into the outside stratum of solids in the curved section of the catalyst path approximately transversely to the direction of catalyst flow to strip out particles of relatively low specific gravity from the outside stratum into the inside stratum, selectively removing the outside stratum rich in contaminated catalyst particles of relatively high specific gravity, and recirculating the remainder of the catalyst to the conversion and regeneration zones.

3. A process according to claim 2 wherein the outside stratum of catalyst particles is relatively rich in iron contaminants.

4. In a process of catalytically cracking hydrocarbon oils wherein hydrocarbon vapors are contacted with a dense turbulent fluidized bed of finely divided cracking catalyst ranging in size from about 50 to 400 mesh in a conversion zone and wherein catalyst is withdrawn directly from said dense turbulent fluidized bed in the conversion zone and circulated to a regeneration zone and thence back into the conversion zone, the improvement which comprises withdrawing a stream of catalyst as a dense downward column from the dense turbulent fluidized bed in said conversion zone, injecting steam in a downward direction into a lower part of the withdrawn catalyst column to accelerate the flow of the resulting catalyst suspension to a velocity between about 30 to 100 ft./sec., passing the accelerated catalyst suspension through a confined elongated path comprising a section of about 5 to 30 feet radius of curvature and curved through approximately a right angle, thereby imparting an abrupt change in direction of flow of the catalyst suspension and creating a centrifugal force at the point of directional change adequate to concentrate solids characterized by a relatively large individual particle weight in an outside stratum of the curved section of the catalyst path and to concentrate solids characterized by a relatively small individual particle weight in an inside stratum of the catalyst path, injecting a small amount of gas into the outside stratum of solids in the curved section of the catalyst path approximately transversely to the direction of catalyst flow to strip out particles of relatively low specific gravity from the outside stratum into the inside stratum, at a point subsequent to the curved section selectively removing from the catalyst path the outside stratum as a substantially horizontal side stream rich in iron contaminated catalyst particles of relatively high specific gravity, injecting a gas into said side stream near its point of removal to produce a jet action whereby flow of particles in the side stream is encouraged, and passing the remainder of the catalyst to the regeneration zone for regeneration and recirculation to the conversion zone.

ALBERT B. WELTY, Jr.

References Cited in the file of this patent

UNITED STATES PATENTS

| Number | Name | Date |
|---|---|---|
| 2,044,915 | Mosley | June 23, 1936 |
| 2,350,759 | Hilmer et al. | June 6, 1944 |
| 2,361,978 | Swearingen | Nov. 7, 1944 |
| 2,393,636 | Johnson | Jan. 29, 1946 |
| 2,430,015 | Hatton et al. | Nov. 4, 1947 |
| 2,437,352 | Fragen | Mar. 9, 1948 |
| 2,500,516 | Carpenter | Mar. 14, 1950 |